(12) United States Patent
Agresta et al.

(10) Patent No.: US 9,043,997 B2
(45) Date of Patent: Jun. 2, 2015

(54) FILTER ASSEMBLY AND METHODS FOR EXTERNAL FILTER FOR AN AQUARIUM

(75) Inventors: Mark Gerard Agresta, Blacksburg, VA (US); Joseph Christopher Carley, Blacksburg, VA (US)

(73) Assignee: Spectrum Brands, Inc., Middleton, WI (US)

( * ) Notice: Subject to any disclaimer, the term of this patent is extended or adjusted under 35 U.S.C. 154(b) by 594 days.

(21) Appl. No.: 13/402,235

(22) Filed: Feb. 22, 2012

(65) Prior Publication Data
US 2013/0213867 A1   Aug. 22, 2013

(51) Int. Cl.
*A01K 63/04* (2006.01)

(52) U.S. Cl.
CPC .................................... *A01K 63/045* (2013.01)

(58) Field of Classification Search
CPC ....... B01D 24/008; B01D 24/12; A01K 63/04
USPC ............... 210/167.22, 167.25, 232, 252, 261, 210/335, 489; 119/259, 260
See application file for complete search history.

(56) References Cited

U.S. PATENT DOCUMENTS

| | | | |
|---|---|---|---|
| 2,729,337 A | | 1/1956 | Alferman |
| 4,427,548 A | * | 1/1984 | Quick, Jr. ...................... 210/617 |
| 4,851,112 A | * | 7/1989 | Schlensker ................... 210/123 |
| 4,895,646 A | | 1/1990 | Willinger |
| 5,059,315 A | | 10/1991 | Senape |
| 5,084,175 A | | 1/1992 | Hoffmeier |
| 5,474,674 A | | 12/1995 | Bresolin et al. |
| 5,965,016 A | | 10/1999 | Suchowski et al. |
| 7,276,169 B2 | | 10/2007 | Marioni |
| 7,488,417 B2 | | 2/2009 | Chauquet et al. |
| 7,628,913 B2 | | 12/2009 | Willinger |
| 7,832,358 B2 | | 11/2010 | Tsai |
| 2011/0000436 A1 | * | 1/2011 | Jang et al. ..................... 119/253 |
| 2011/0147288 A1 | | 6/2011 | Mihlbauer et al. |

FOREIGN PATENT DOCUMENTS

EP   1 231 384 A1   8/2002

OTHER PUBLICATIONS

Tetra*tec* Manual for Models EX 400/EX 600/EX 700/EX 1200/EX 2400 retrieved Apr. 3, 2008 from TTec_EX_07_TH50447_0715884.qxd:TTec_Installation_EX_Installation_2007.qxd.
Description of a Tiffin Carrier, existing prior to Feb. 22, 2012; published on Wikipedia on Mar. 27, 2012.

* cited by examiner

*Primary Examiner* — Fred Prince
(74) *Attorney, Agent, or Firm* — Merchant & Gould P.C.

(57) ABSTRACT

An external filter for an aquarium includes a canister filter having a filter assembly removably oriented therein. The filter assembly includes at least two stacked trays releasably secured together in series. The stacked trays include a compartment for holding filter media. In one embodiment, the trays are releasably secured together with a strap. In one embodiment, the filter assembly also includes a handle. In one example, the strap forms a portion of the handle.

36 Claims, 13 Drawing Sheets

FILTER ASSEMBLY AND METHODS FOR EXTERNAL FILTER FOR AN AQUARIUM

TECHNICAL FIELD

This disclosure relates to an external aquarium filter, and more particularly, to a canister filter, which is positioned externally of an aquarium tank.

BACKGROUND

Numerous types of filtering apparatus are available for aquarium filtration. Generally, it is desired that the apparatus should perform basic types of filtration such as mechanical filtration, chemical filtration, and biologic filtration. One type of aquarium filter is an external aquarium filter, which is a filtration system that rests externally of the aquarium tank. Typically, contaminated water is extracted from the aquarium tank and supplied to the filter. The water is filtered and then is returned to the aquarium tank.

One type of external aquarium filter is referred to as a canister filter. Such filters are generally placed adjacent to or beneath the aquarium tank and are typically in the form of a can. Water is drawn out of the aquarium tank and passes through a port in the canister filter. The water then flows through filtration material and is returned from the can back to the aquarium tank.

From time to time, the canister filter needs servicing. As part of the servicing, the canister filter is opened, and the filtration media is either cleaned or completely replaced. The servicing process can be time consuming and unpleasant for the user, if the canister is filled with dirty water. Improvements are desirable.

SUMMARY

The present disclosure related to a filter assembly for an external filter for an aquarium. The filter assembly includes at least two stacked trays releasably secured together in series. Each of the trays has a compartment for holding filter media for filtration of the aquarium water.

In one example, each of the trays has an outer surrounding wall defining an interior volume; an open top face; a porous holding grid extending between the surrounding wall; and a compartment for holding filter media that is within the interior volume oriented on the porous holding grid. The trays are vertically stacked, such that there is a bottom tray, and the open top face of the bottom tray is adjacent to and covered by the porous holding grid of the tray stacked above the bottom tray.

In one example, the at least two stacked trays are releasably secured together with a selectively removable strap.

In one example, the at least two stacked trays are releasably secured together with a removable strap that extends along opposite sides of the stacked trays.

In one example, the at least two stacked trays are releasably secured together and include a handle at a top portion of the stacked trays.

In one example, the at least two stacked trays are releasably secured together with a selectively removable strap that extends along opposite sides of the stacked trays and forms a handle at a top portion of the stacked trays.

In another aspect, the present disclosure relates to a tray for a filter assembly for an external filter for an aquarium. The tray includes an outer surrounding wall having an exterior portion and an interior portion, with the interior portion defining an interior volume. The tray also includes an open top face, a porous holding grid extending between the surrounding wall, which can be removable from the surrounding wall, a compartment for removable and replaceable filter media within the interior volume oriented on the porous grid, and attachment structure constructed and arranged to permit releasable attachment to other trays.

In one example, the attachment structure includes first and second protrusions. The second protrusion is spaced on an opposite side of the tray from the first protrusion.

In another aspect, the present disclosure provides an external filter for an aquarium including a canister having a canister housing body and a removable cover assembly. The cover assembly may include a motor unit, a water inlet, and a water outlet. The housing body will have an open top closable by the cover assembly, an interior, and a closed bottom. A filter assembly is removeably oriented in the interior of the housing body. The filter assembly includes at least two stacked trays releasably secured together in series. The trays are vertically stacked to result in a bottom tray. The open top face of the bottom tray will be adjacent to and covered by a porous holding grid of the tray stacked above the bottom tray.

In one example, the bottom tray includes a bottom wall having an open aperture therein. The closed bottom of the housing body of the canister may include a projection extending into the interior of the housing body. In one example, the aperture of the bottom wall of the bottom tray is in sealing engagement with the projection of the closed bottom of the housing body.

In another aspect, the present disclosure provides a method of servicing a filter assembly for an external canister filter for an aquarium. The method includes removing a cover from a canister filter to access an interior of the canister filter. Next, there is a step of grasping a handle secured to a stack of trays, each of the trays in the stack being releasably secured together. There is also a step of removing in a single step the stacked trays from the canister filter, with each of the stacked trays holding removable filter media.

In one example, the step of removing in a single step the stacked trays from the canister filter includes breaking a seal between an open aperture in a bottom tray in the stacked strays and a closed projection extending from a bottom of the canister filter.

In one example, the method includes after removing in a single step the stacked trays from the canister filter, a step of unsecuring each of the trays from the stack of trays. This step may include, in one example, releasing engagement between a strap securing each of the trays together and protrusions extending from the trays.

A variety of examples of desirable product features or method are set forth in part in the description that follows, and in part will be apparent from the description, or may be learned by practicing various aspects of the disclosure. The aspects of the disclosure may relate to individual features as well as combinations of features. It should be understood that both the forgoing general description and the following detailed description are explanatory only, and are not restrictive of the claimed invention.

BRIEF DESCRIPTIONS OF THE DRAWINGS

Figure 5:
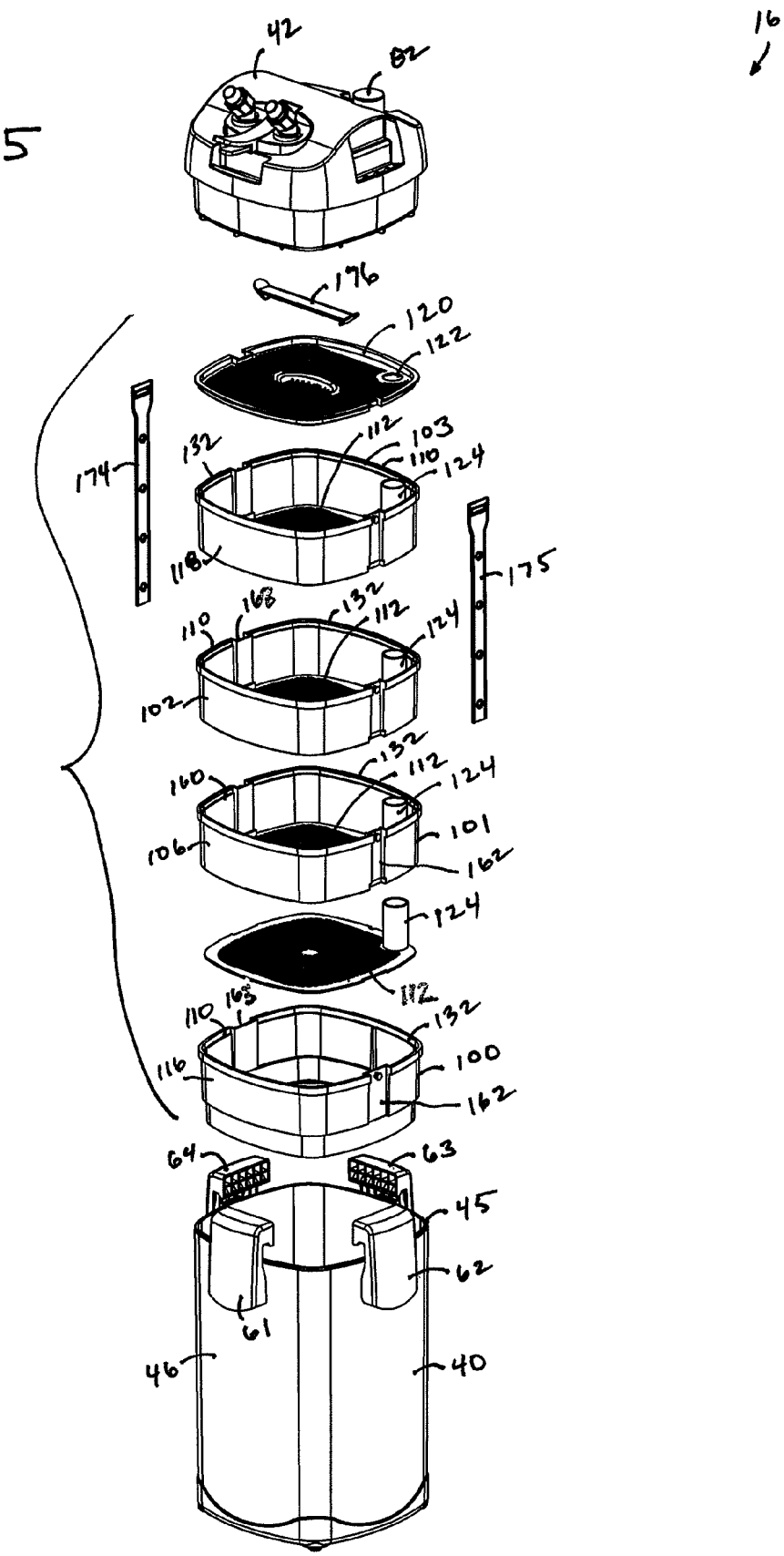
FIG. 5 is a perspective, exploded view, in which the filter assembly is further exploded into component parts, constructed in accordance with principles of this disclosure.
Figure 12:
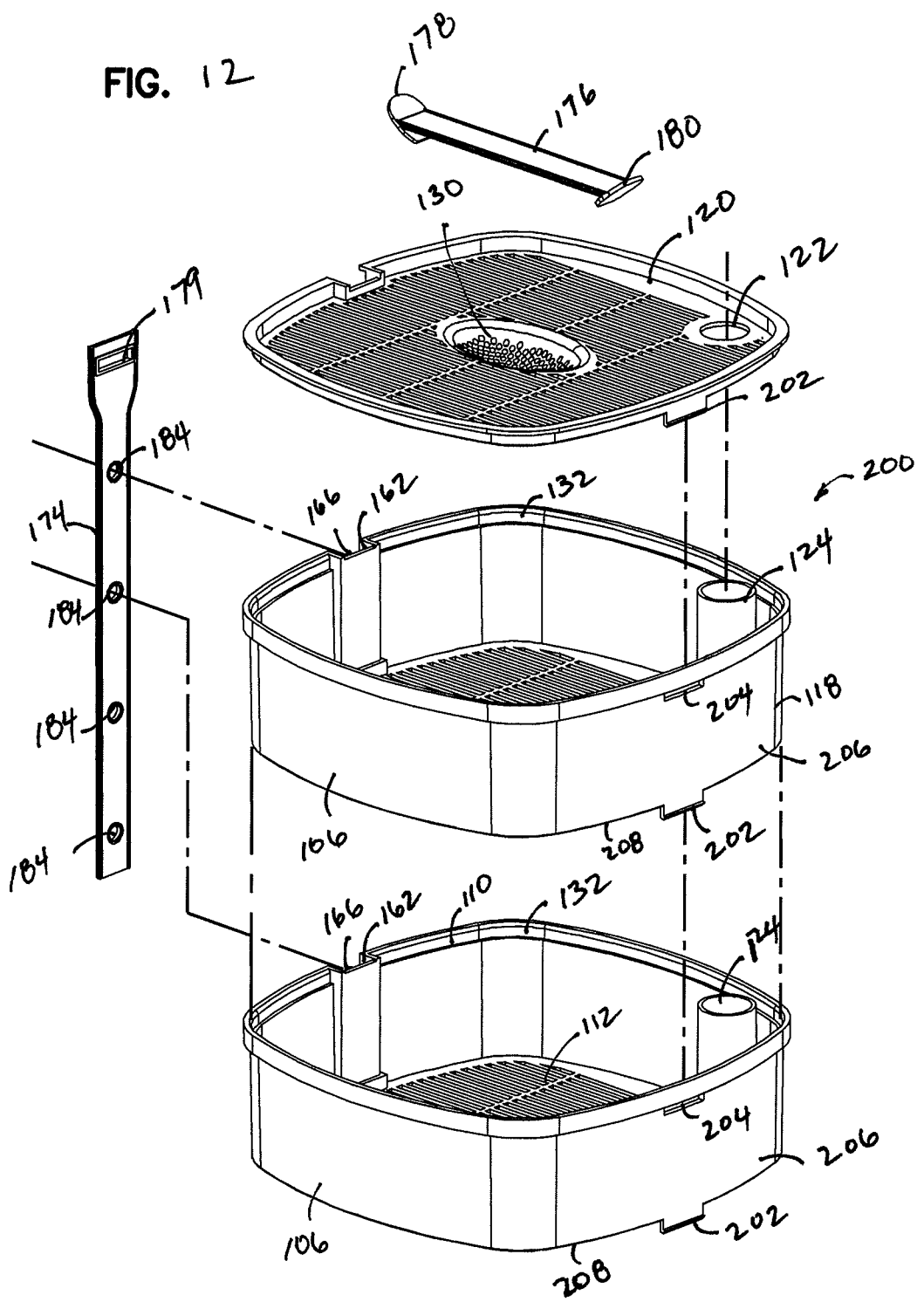
Figure 13:
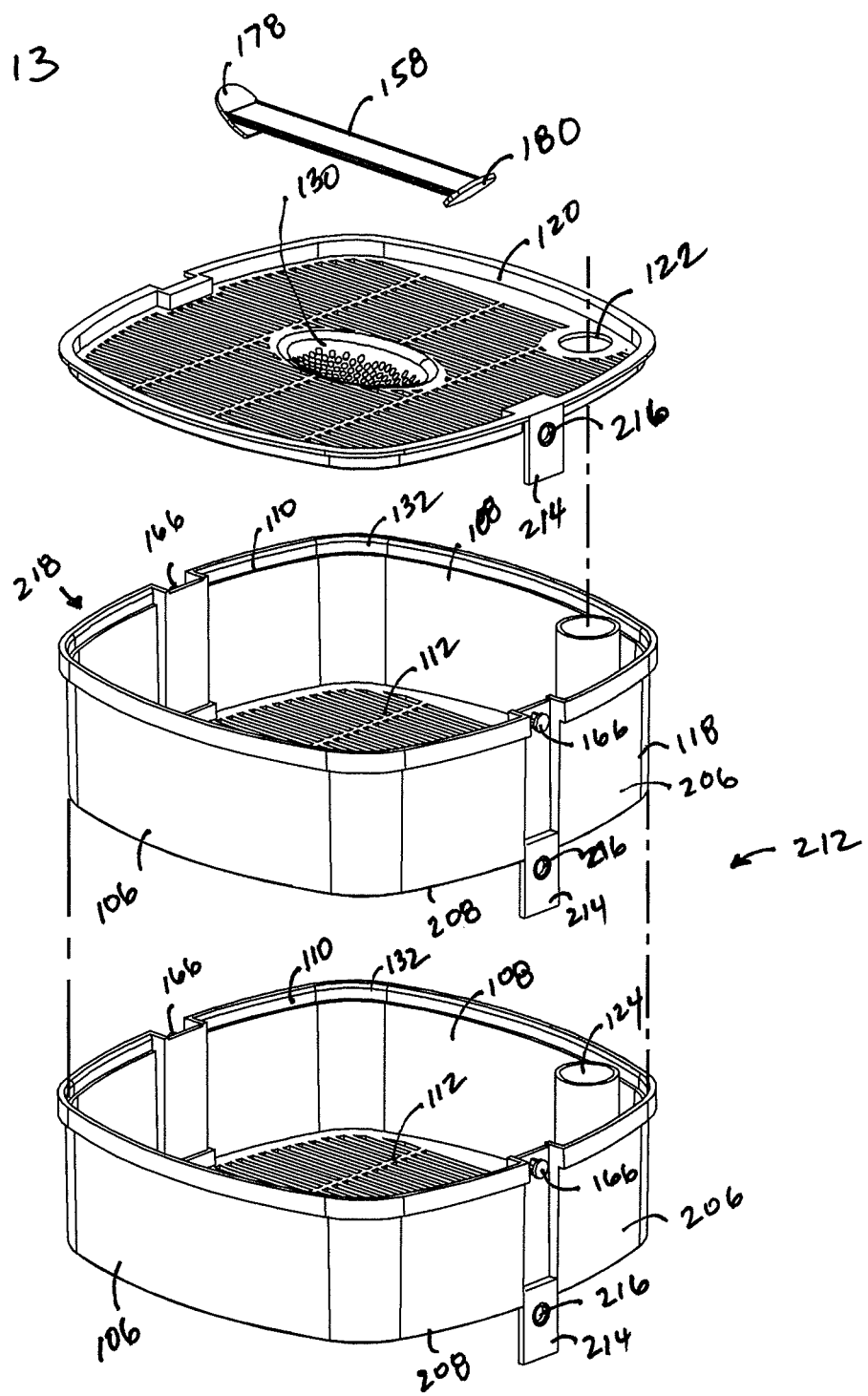

FIG. 12 is an exploded, perspective view of a portion of another embodiment of the filter assembly of FIG. 5, showing another way of releasably securing the trays together, constructed in accordance with principles of this disclosure; and FIG. 13 is an exploded, perspective view of a portion of another alternate embodiment of the filter assembly of FIG. 5, showing yet another way of releasably securing the trays together, constructed in accordance with principles of this disclosure.

There is no specific requirement that the external filter or filter assembly, components, features, or assemblies include all of the features depicted and techniques disclosed in order to obtain some advantage. In general, selected use of the features and/or methods, without the use of others, can still lead to advantageous systems.

DETAILED DESCRIPTION

Reference will now be made in detail to example aspects of the present disclosure that are illustrated in the accompanying drawings. When possible, the same reference numbers will be used throughout the drawings to refer to the same or like parts.

A. Overview of the System

Figure 1:
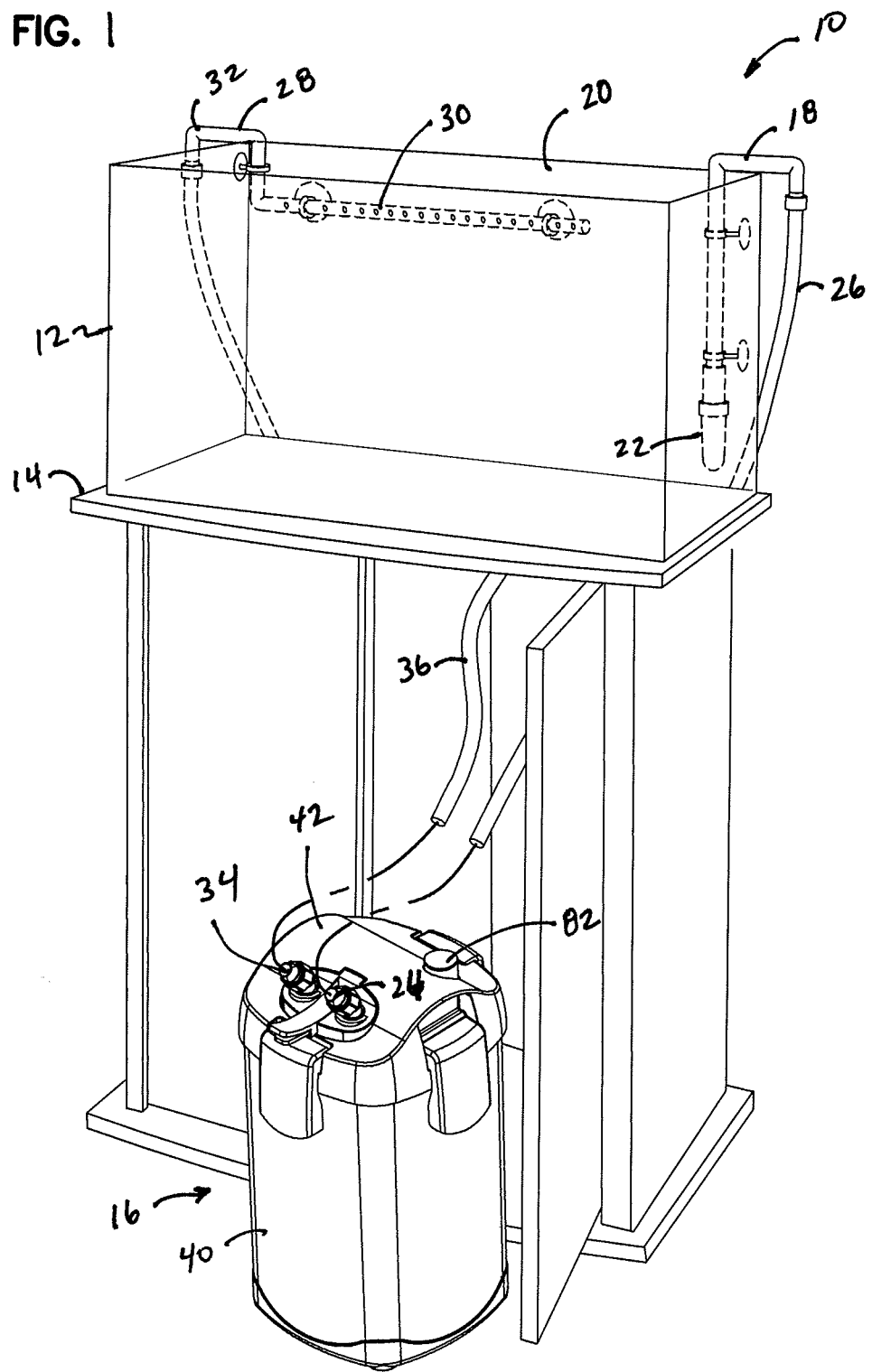
FIG. 1 is a schematic, perspective view of a system including an aquarium and an external filter for the aquarium, in accordance with principles of this disclosure.
Figure 2:
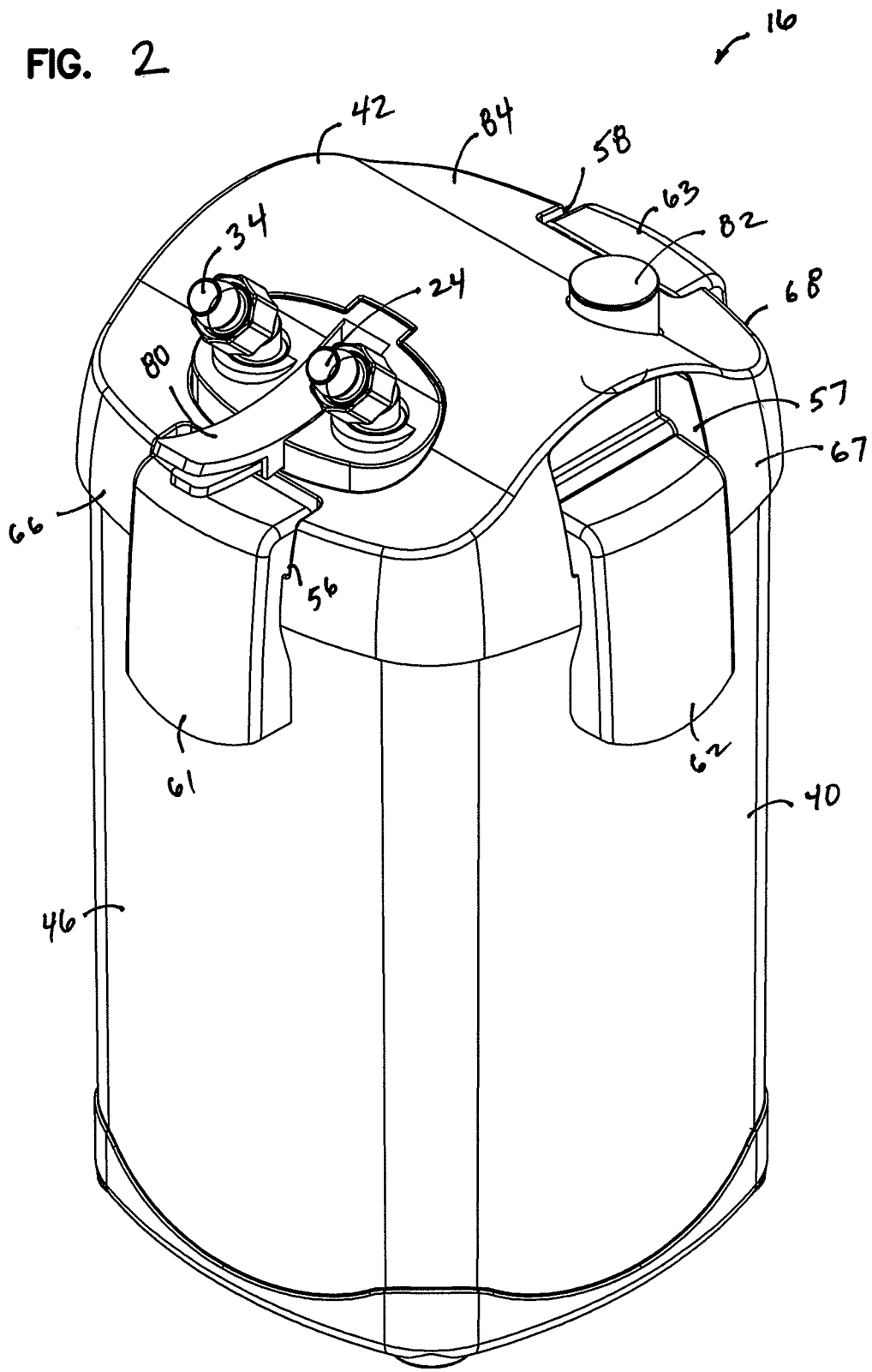
FIG. 2 is a perspective view of the external filter of FIG. 1, constructed in accordance with principles of this disclosure.

Referring now to the drawings, there is shown a system 10 including an aquarium tank 12 resting on a table 14. In the example shown, resting below the table 14 is an external canister filter 16, constructed in accordance with principles of this disclosure. The system 10 includes a water intake pipe 18 that is positioned in the interior volume 20 of the tank 12, such that it is submerged in the water in the aquarium. The intake pipe 18 will typically include a strainer 22, which helps to prevent drawing in fish or large debris into the intake pipe 18. The intake pipe 18 delivers water to be filtered from the interior volume 20 of the tank 12 to a water inlet 24 of the canister filter 16. In the drawings shown in FIG. 1, the intake pipe 18 and the water inlet 24 are connected by tubing 26, but the tubing 26 is shown, for purposes of clarity, disconnected from the water inlet 24. It should be understood that in use, the tubing 26 is connected for liquid communication with the water inlet 24.

Also shown in system 10 is a flow return pipe 28. In the example shown, the flow return pipe includes a spray bar 30 and overflow pipe 32. The flow return pipe 28 is connected to a water outlet 34 of the canister filter 16 by tubing 36. Again, in FIG. 1 for purposes of clarity, the tubing 36 is not shown connected to the water outlet 34, but in use, the tubing 36 will be connected to provide liquid flow communication from the water outlet 34 to the flow return pipe 28.

In general, in use, water from the tank 12 is drawn from the tank 12 through the intake pipe 18 and is conveyed through the tubing 26 to the canister filter 16 through the water inlet 24. Once in the canister filter 16, the water is directed through a filter assembly 38 (FIG. 3) where it is filtered. The filtered water is then directed through the water outlet 34, through the tubing 36, and back to the interior volume 20 of the tank 12 through the flow return pipe 28.

B. Example Canister Filter

Turning now to FIGS. 2-4 and 10, further details on the canister filter 16 are described. The canister filter 16 shown in FIGS. 2-4 and 10 includes a canister housing body 40 and a removable cover assembly 42. The housing body 40, in the example embodiment shown, has an open top 44, which is closable by the cover assembly 42. The housing body 40 further includes a housing wall 46 surrounding and closing an interior 48 and a closed bottom 50. The open top 44 is surrounded by a rim 45, which is at a free end of the housing wall 46.

Figure 4:
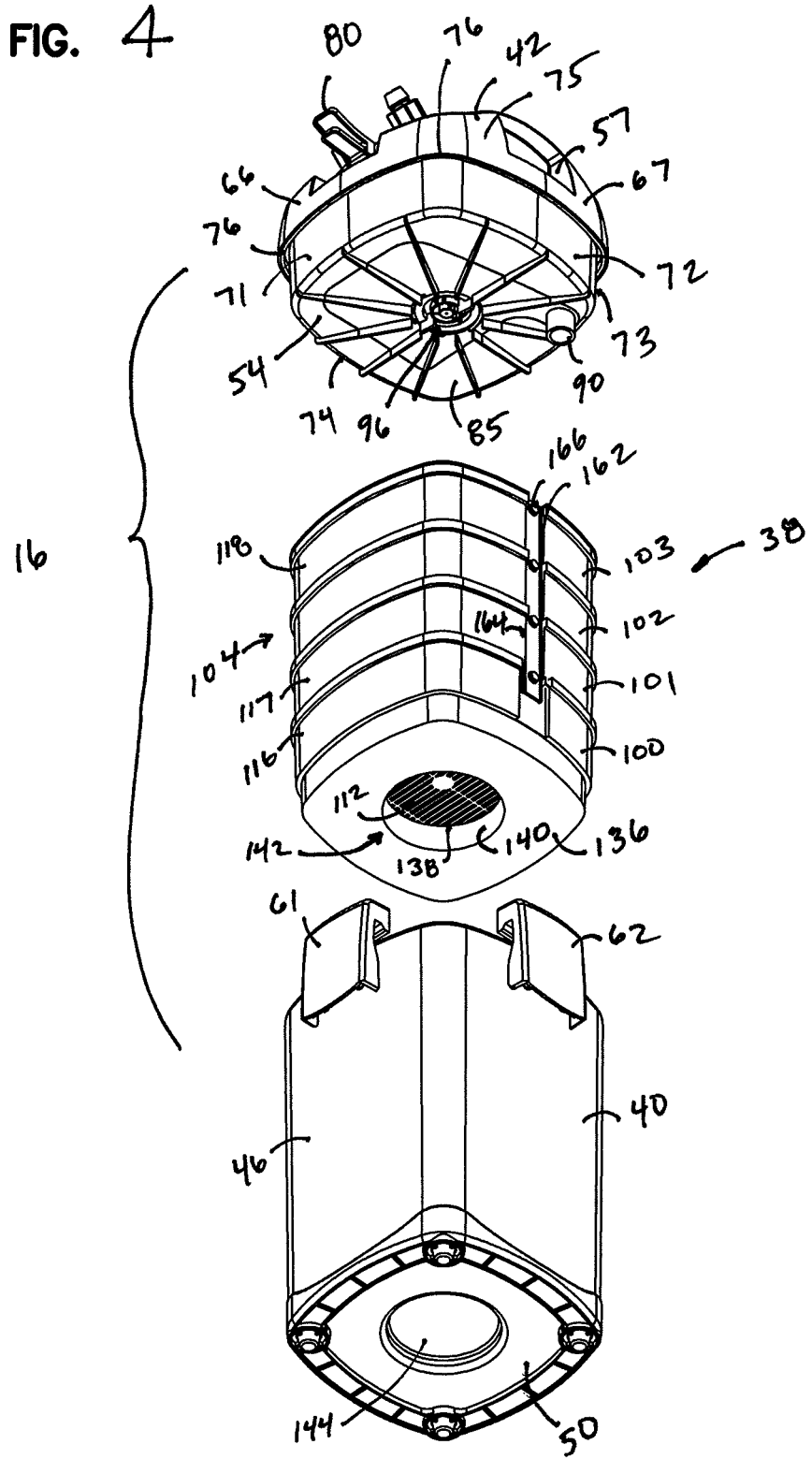
FIG. 4 is an exploded, bottom perspective view of the filter of FIG. 2, constructed in accordance with principles of this disclosure.

The cover assembly 42, in this embodiment, includes the water inlet 24, and water outlet 34 to convey water to be filtered and filtered water to and from the canister filter 16. In this embodiment, the cover assembly 42 also includes a motor unit 52 (FIG. 9) enclosed by an impeller case 54 (FIG. 4). The motor unit 52 works in a conventional fashioned known to those skilled in the art in order to convey water from the tank 12, through the filter assembly 38, and back to the tank 12.

The cover assembly 42 further includes a plurality of spaced buckle catches 56, 57, 58, and 59. The buckle catches 56-59 are inwardly directed recesses in the cover assembly 42, with one catch along each side 66, 67, 68, 69 of the generally rectangular cover assembly 42. The buckle catches 56-59 receive latches or buckles 61, 62, 63, 64 projecting or extending from the housing body 40. In the example shown in FIGS. 3, 4, and 10, the buckles 61-64 project above the rim 45 and the open top 44 so that when the cover assembly 42 is oriented to fit within the open top 44, the buckles 61-64 catch and engage one of the buckle catches 56-59.

Figure 8:
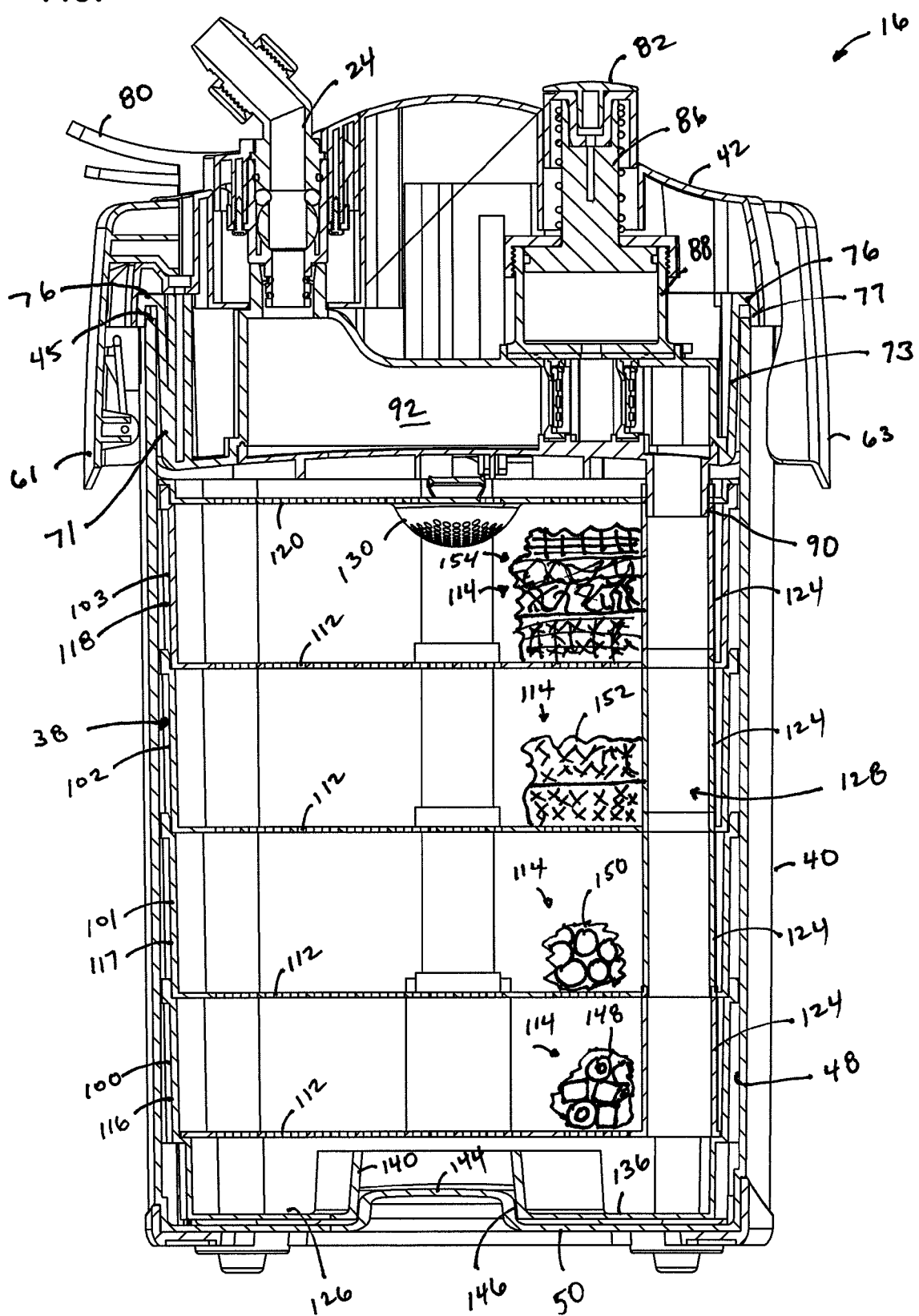
FIG. 8 is a cross-sectional view of the external filter of FIG. 7, the cross section being taken along the line A-A of FIG. 7, constructed in accordance with the principles of this disclosure.
Figure 9:
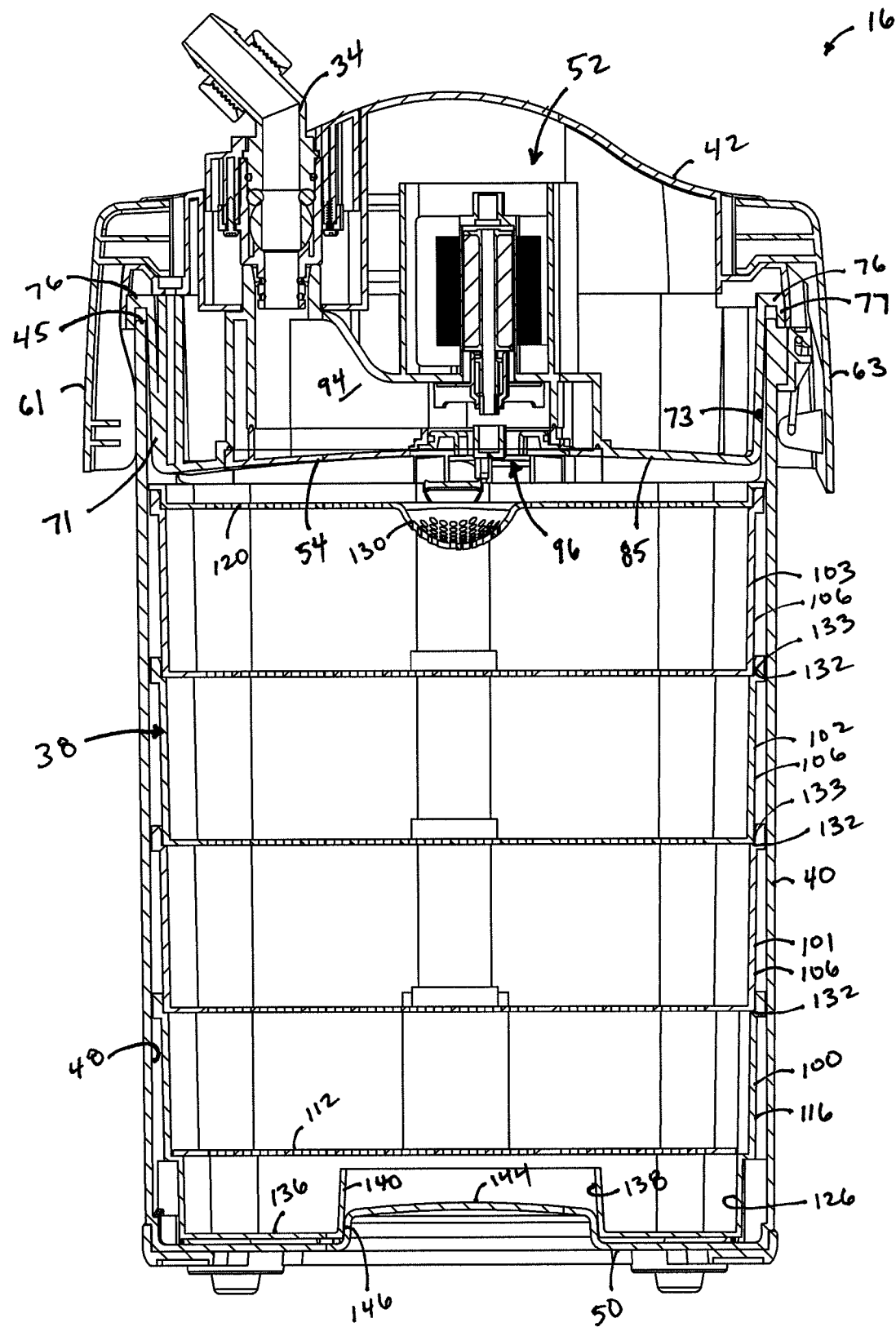
FIG. 9 is a cross-sectional view of the external filter of FIG. 2, the cross section being taken along the line B-B of FIG. 7, constructed in accordance with the principles of this disclosure.

In this example shown, the cover assembly 42 has along each of its sides 66-69 a canister portion 71, 72, 73, 74. The canister portions 71-74 are recessed relative to the portions of the sides 66-69 that define the buckle catches 56-59. In the embodiment shown, there is a ridge 76 that goes around the entire perimeter of the cover assembly 42, which divides the canister portions 71-74 from the portions 75 above the ridge 76. In use, the canister portions 71-74 are within the interior 48 of the housing body 40, when the cover assembly 42 is operably mounted on the housing body 40. In particular, the ridge 76 catches the rim 45 of the housing wall 46. As can be seen in FIGS. 8 and 9, in one example, the ridge 76 forms a U-shaped seal 77 to engage and overlap the rim 45. This U-shaped seal 77 helps to both secure the cover assembly 42 in place on the housing body 40, as well as prevent leakage of water from the canister filter 16.

On the cover assembly 42 is a locking lever 80. In this embodiment, the locking lever 80 is depicted as centered between the water inlet 24 and the water outlet 34. The locking lever 80 can be pushed against the buckle catch 56 after the cover assembly 42 is operably mounted on the housing body 40 to fix the cover assembly 42 in place.

A start button 82 projects from a top 84 of the cover assembly 42. The start button 82, as can be seen in FIG. 8, is operably connected to a spring loaded piston assembly 86. By repeatedly pushing the start button 82, the piston assembly 86 is moved repeatedly within cylinder 88, which helps to create a vacuum draw with the water inlet 24. In other words, the start button 82 helps to prime the water inlet 24 to help start the flow of water from the tank 12 and into the water inlet 24. Although not shown in FIG. 1, the motor unit 52 is powered by an electrical cord, and once power is connected to the motor unit 52, the water will flow from the filter assembly 38, through the water outlet 34, and return through the flow return pipe 28.

In reference now to FIGS. 4, 8, and 9, the cover assembly 42 further includes, in the example shown, a flow tube 90 in extension from the bottom 85 of the cover assembly 42. The flow tube 90 is in liquid flow communication with an inlet reservoir 92 (FIG. 8) in the cover assembly 42. The inlet reservoir 92 is in liquid flow communication and is below the water inlet 24. The inlet reservoir 92 is also in communication with the piston assembly 86, such that when the start button 82 is pumped, a vacuum draw is created in the inlet reservoir 92, which pulls water from the tank 12 through the tubing 26, and to the water inlet 24. Thus, water to be filtered flows through the water inlet 24, into the inlet reservoir 92, and then is directed through the flow tube 90. From the flow tube 90, the water to be filtered is directed into the filter assembly 38, to be discussed further below.

In FIG. 9, an outlet reservoir 94 can be seen within the cover assembly 42. The outlet reservoir 94 is in liquid flow communication with the water outlet 34. Water that has been filtered by the filter assembly 38 is returned to the cover assembly 42 through an aperture arrangement 96 in the bottom 85 of the cover assembly 42. As can be seen in FIG. 9, in this embodiment, the aperture arrangement 96 is just below the motor unit 52, and the motor unit 52 operates to draw and pull the water through the filter assembly 38 and then through the aperture arrangement 96 to the outlet reservoir 94. From the outlet reservoir 94, the water flows through the water outlet 34 to be returned to the tank 12 by way of the return pipe 28.

C. Example Filter Assembly

Turning now to FIGS. 3-6, one example filter assembly 38 is shown and described. In general, the filter assembly 38 is sized and shaped for removable orientation in the interior 48 of the housing body 40.

In general, in accordance with principles of this disclosure, the filter assembly 38 includes at least two stacked trays 100, 101. In some implementations, the at least two stacked trays will further includes a third tray 102. In some implementations, the stacked trays will further include at least a fourth tray 103. In some examples, there may be more than four trays. In general, in operation, the trays 100-103 are stacked in series to form a stack 104. As used herein, when the term "stacked trays 104" or variations thereof are used, it can mean only two trays or more than two trays.

In general, each of the trays in the stack 104 includes an outer surrounding wall 106 defining an interior volume 108. In general, there is an open top face 110 and a porous holding grid 112 extending between the surrounding wall 106. The porous holding grid 112 may be permanently or removably mountable for each tray within the outer wall 106. The interior volume 108 forms a compartment for holding filter media 114 (FIG. 8).

Filter media 114 (FIG. 8) can be removably oriented within the compartment or interior volume 108 of each tray in the stack 104, by being oriented on and held by the porous holding grid 112. The media 114 is removable from each of the trays in the stack 104. The media 114 can be washed and then replaced within the trays, or it may be replaced altogether within the interior volume 108 of the trays in the stack 104. In FIG. 8, it should be understood that the media 114 is shown in only partial cross-section, for purposes of clarity. It should be understood that the media 114 will typically extend across the entire or a substantial portion of the grid 112 filling a substantial portion of the interior volume 108 of each of the trays of the stack 103. Specific, preferred filter media 114 for each of the trays in the stack 104 is described further below.

The stack of trays 104 is vertically stacked such that there is a bottom tray 116. In the example shown in FIGS. 3-5, the tray shown at 100 corresponds to the bottom tray 116. When the trays are vertically stacked, the open top face 110 of the bottom tray 116 is adjacent to and covered by the porous holding grid 112 of the tray 117 stacked above the bottom tray 116. In the example shown in FIGS. 3 and 4, the tray 117 stacked above the bottom tray 116 also corresponds to tray 101. Thus, in the example shown in FIG. 8, the porous holding grid 112 of the tray 117 is shown adjacent to and covering the open top face 110 of the bottom tray 116.

The stacked trays 104 also include an uppermost top tray 118 in the stack 104. In this example, the uppermost top tray 118 corresponds to the tray 103. In other examples, when there are only two trays, the uppermost tray would be tray 101. When there are three trays, the uppermost top tray would be tray 102. When there are more than four trays in the stack 104, it would correspond to the uppermost tray in the stack 104.

The uppermost top tray 118 further includes porous grid 120 covering its open top face 110. The porous grid 120 includes an aperture 122 to receive the flow tube 90 (FIG. 8) of the cover assembly 42. The flow tube 90, in the example shown, extends through the aperture 122 and into inlet tube 124. In general, each of the porous grids 112 includes inlet tube 124 extending therefrom. The inlet tube 124 allows water to flow from the cover assembly 42, through the flow tube 90, and then pass though each of the inlet tubes 124 in the stack 104 as a way of bypassing the filter media 114 to be directed to an unfiltered reservoir 126 located in the bottom tray 116. The unfiltered reservoir 126 is described further below.

As can be seen in FIG. 8, the stack 104 is arranged in a vertical stack in series such that the inlet tube 124 of each of the trays forms one continuous liquid flow channel 128 (FIG. 8) in liquid flow communication with the inlet reservoir 92 of the cover assembly 42. The liquid flow channel 128 leads to the unfiltered reservoir 126 located at the bottom of the stack 104.

In the particular example shown in FIGS. 3, 5, 6, and 8-10, the porous grid 120 of the uppermost top tray 118 preferably includes a concave portion 130, although alternatives are available. The concave portion 130 is concave or recessed from the outer portion of the porous grid 120. In the example shown, the concave portion 130 is approximately centered within the grid 120. One purpose of the porous grid 130 will become evident below.

The outer surrounding wall 106 of each of the trays in the stack 104 defines an upper rim 132. The open top face 110 is surrounded by the upper rim 132. The trays 100-103 are vertically stacked so that each tray 100-103 nests within the upper rim 132 of the tray immediately below it. So, for example, tray 101 nests within the upper rim 132 of tray 100. Tray 102 nests within the upper rim 132 of tray 101. Tray 103 nests within the upper rim 132 of tray 102. In FIG. 9, it can be seen how the upper rim 132 forms a shelf 133 that is sized to receive the wall 106 of the tray adjacently stacked above it.

In reference now to FIGS. 3-5 and 8-10, the bottom tray 116 in the embodiment shown includes a bottom wall 136 extending from the outer surrounding wall 106 and spaced from the bottom tray porous holding grid 112. The bottom wall 136 is at an end of the bottom tray 116 opposite of the bottom tray open top face 110. In the embodiment shown, the bottom wall 136 preferably includes an open aperture 138 therein. In the embodiment shown, the open aperture 138 is defined by a generally vertically extending wall 140 projecting or extending from the bottom wall 136. In general, the volume between the porous grid 112 of the bottom tray 116 and the bottom wall 136 forms the unfiltered liquid reservoir 126. Unfiltered liquid flows through the flow channel 128 and is directed vertically downwardly into the unfiltered reservoir 126 in the bottom tray 116.

The open aperture 138 in the bottom wall 136 functions as a drain 142 (FIG. 4) of the filter assembly 38. That, when the filter assembly 38 is removed from the housing body 40, liquid that is still within the stack 104 drains by gravity through the aperture 138. The drained liquid will then collect within the interior 48 of the housing body 40.

As mentioned previously, the housing body 40 has closed bottom 50. The closed bottom 50 of the housing body 40 preferably includes a projection 144 extending into the interior 48 of the housing body 40. Preferably, the projection 144 has an outer perimeter shape that corresponds to an inner perimeter shape of the wall 140 defining the open aperture 138. Preferably, the shape of the projection 144 and the shape of the wall 140 are sized to create a tight, contact fit therebetween. In the example shown in FIGS. 8 and 9, the projection 144 has an outer circular shape, while the shape of the wall 140 is also circular, such that the projection 144 is received within the wall 140. Preferably, a sealing engagement 146 results between the tight and close contact between the wall 140 and the projection 144. In this manner, liquid to be filtered, once it flows through the flow channel 128 and into the unfiltered reservoir 126 will remain within the filter assembly 38 and not bypass the filter assembly 38 by flowing through the open aperture 138. Rather, the sealing engagement 146 between the aperture 138 and the projection 144 will prevent the unfiltered liquid in the reservoir 126 from passing through the aperture 138 and outside of the filter assembly 38 into the interior 48 of the housing body 40.

In reference to FIG. 8, example filter media 114 is schematically shown within the interior volume 108 of each of the trays 100-103. It should be noted that in the exploded views of FIGS. 5 and 6 and in the view of FIG. 9, the media 114 is omitted for purposes of clarity. The filter media 114 can include various types of media, arranged in various orientations. In the example shown in FIG. 8, the media 114 in the bottom tray 116 includes ceramic rings or beads 148. The ceramic beads 148 are helpful in physically filtering impurities while distributing the water flow in a number of directions to ensure that the water passes evenly through the filter assembly 38. The ceramic beads 148 may be periodically removed from the bottom tray 116 and washed. If dirt collects on the surface of the beads 148 and cannot be removed by washing, the beads 148 are replaced with new beads 148.

In the example shown in FIG. 8, in tray 101, which is the tray immediately adjacent to the bottom tray 116, the media 114 includes plastic balls 150. The balls 150 are helpful in breeding useful bacteria in the small spaces of the balls 150. Impurities are divided and neutralized biologically. The balls 150 can be removed from the tray 101 and periodically washed. If there is dirt that cannot be removed by washing, the balls 150 are replaceable with new balls 150.

Still in reference to FIG. 8, in the example shown, the tray 102 immediately adjacent to and stacked on the tray 101 can include one or more layers of black foam 152. The foam 152 allows production of useful bacteria, which break up dirt particles and biologically filter impurities. The foam 152 is typically removed and replaced with new foam 152. In some arrangements, it could be washed and reused as well.

In the example shown in FIG. 8, the top tray 118 has media 114 in the form of a bio-bag cartridge 154. In the example shown, the bio-bag cartridge 154 includes two pieces of filter floss and a pad of activated carbon. The filter floss is typically a fine material of woolen mat to catch fine impurities not trapped by the other filter media. The activated carbon chemically removes substances such as pesticides from the water and adsorbs odors and substances that cause muddying and yellowing of the water. The bio-bag cartridge 154 will typically be removed and replaced with a new bio-bag cartridge 154 periodically, such as on a monthly basis.

D. Releasable Attachment of the Stacked Trays

As mentioned previously, the stacked trays 104 are releasably secured (or attached or connected) together in a series. By the term "releasably secured together," and variations thereof, it is meant that each of the trays in the stack 104 are attached, or secured, or connected together such that to detach or separate the trays in the stack 104 into individual trays can be done without destruction of any of the trays in the stack 104. Preferably, they can be detached from each other without the use of tools, although, in other embodiments, it could take tools to separate the trays from each other, but this is not preferred. The stacked trays 104 can be releasably secured together in a number of different ways. Some examples are illustrated in FIGS. 3-10; FIG. 11; FIG. 12; and FIG. 13. It should be understood that there are many embodiments that can be made, and these illustrated examples are only a few of the many possibilities for releasably securing together the trays.

In the particular example shown in FIGS. 3-10, the stacked trays 104 are releasably secured together with a selectively removable strap 156. In general, each of the trays forming the stack 104 is releasably connectable to the strap 156 in a manner which releasably connects each of the trays in the stack 104 together. Examples of how the trays are secured to the strap 156 are described further below. Other non-limiting examples of stacked trays 104 being releasably secured together are shown in FIGS. 11-13, described below.

In one example embodiment, the filter assembly 38 includes a handle 158 secured to the stack 104. The handle 158 allows for moving and manipulation of all of the trays in the stack 104 in a single step.

In one example, the handle 158 extends above the stack 104 and over the porous grid 120 of the top tray 118. In other examples, the handle 158 can be located in alternate locations. While a variety of implementations are possible, in one example preferred embodiment, the handle 158 is also part of the strap 156, although it does not have to be. This is discussed further below.

Figure 6:
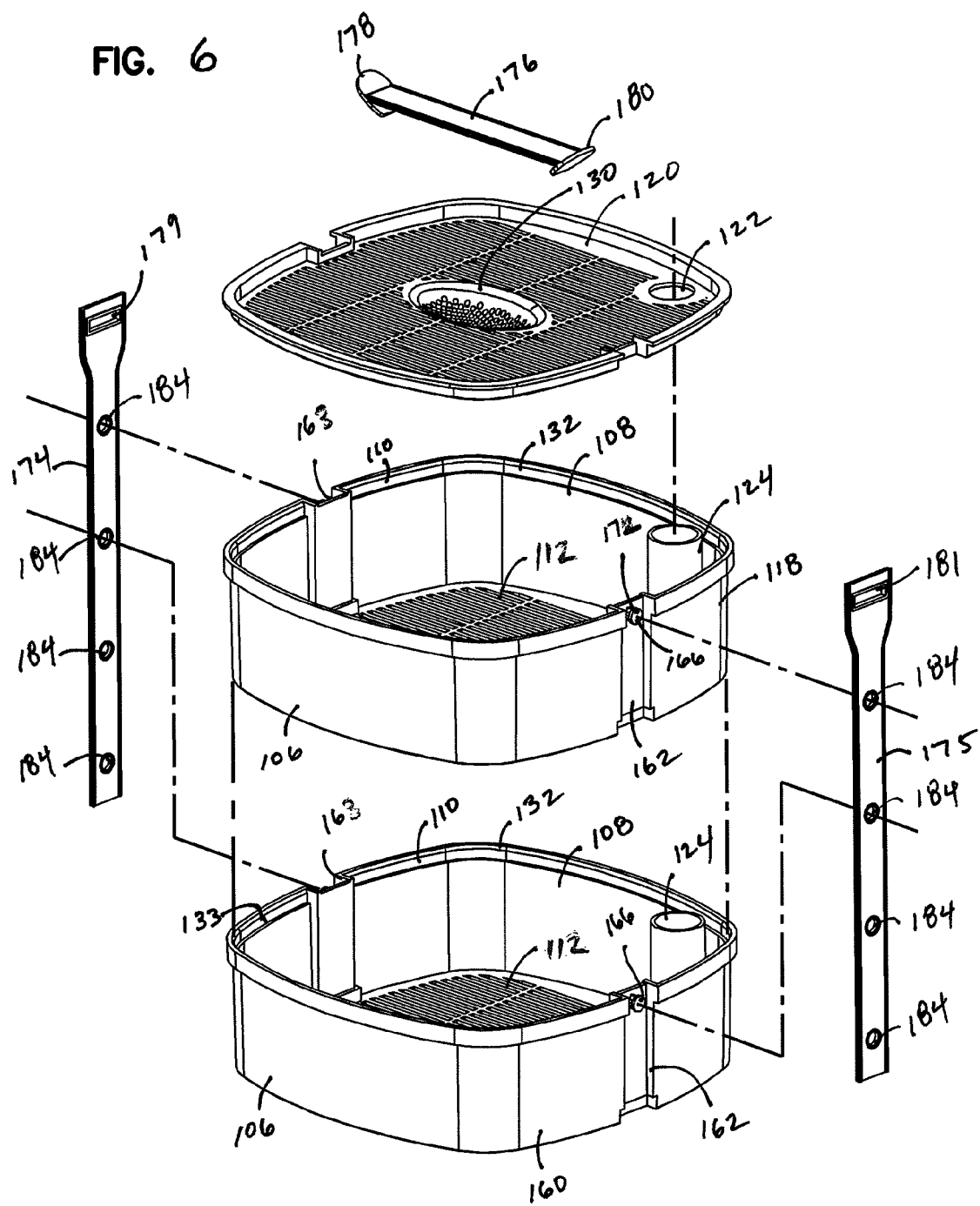
FIG. 6 is an exploded, perspective view of a portion of the filter assembly of FIG. 5, constructed in accordance with the principles of this disclosure.
Figure 7:
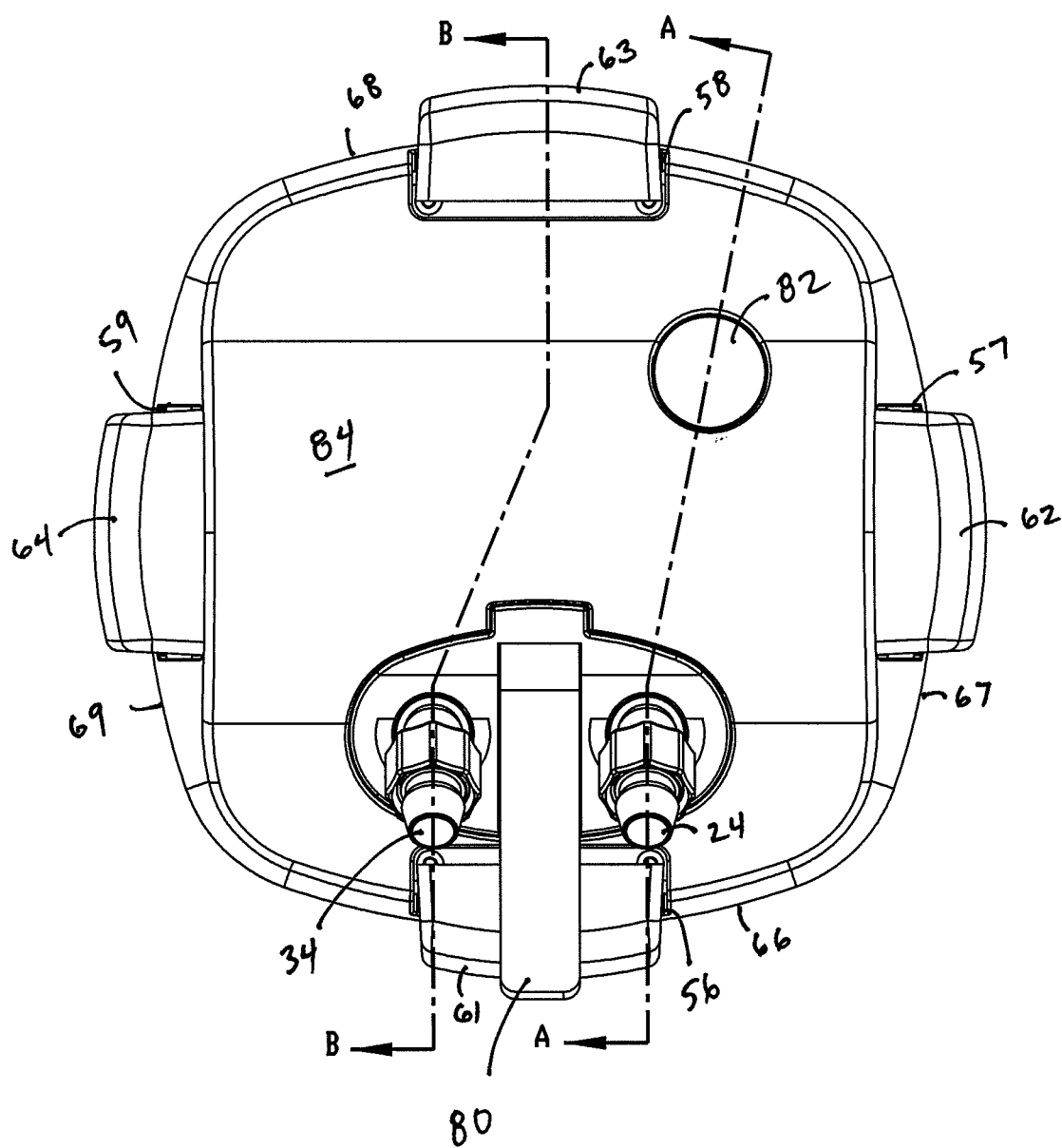
FIG. 7 is a top view of the external filter of FIG. 2, constructed in accordance with the principles of this disclosure.
Figure 10:
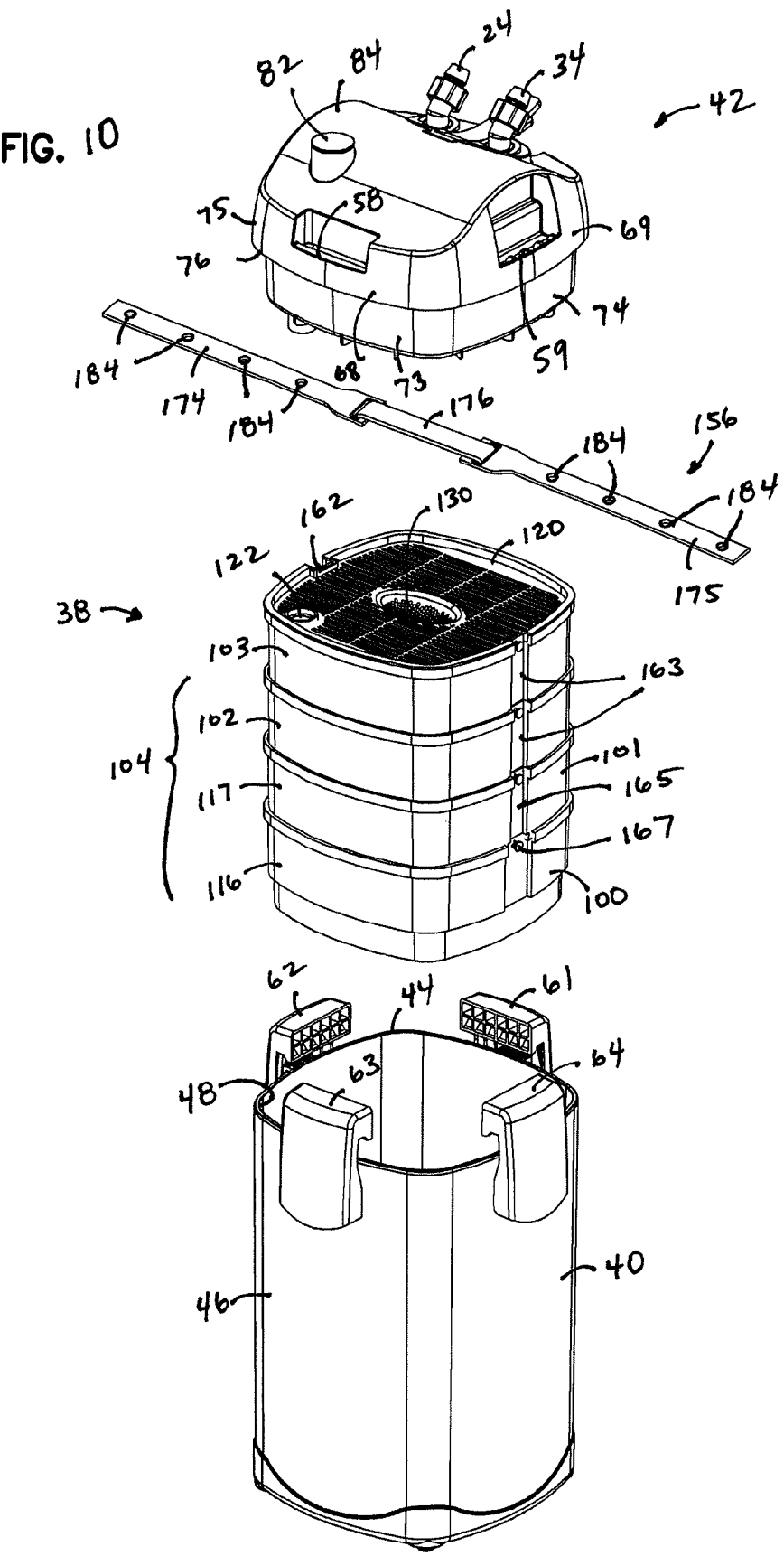
FIG. 10 is an exploded, top perspective view of the filter of FIG. 2 similar to FIG. 3, but shown from an opposite side, constructed in accordance with the principles of this disclosure.
Figure 11:
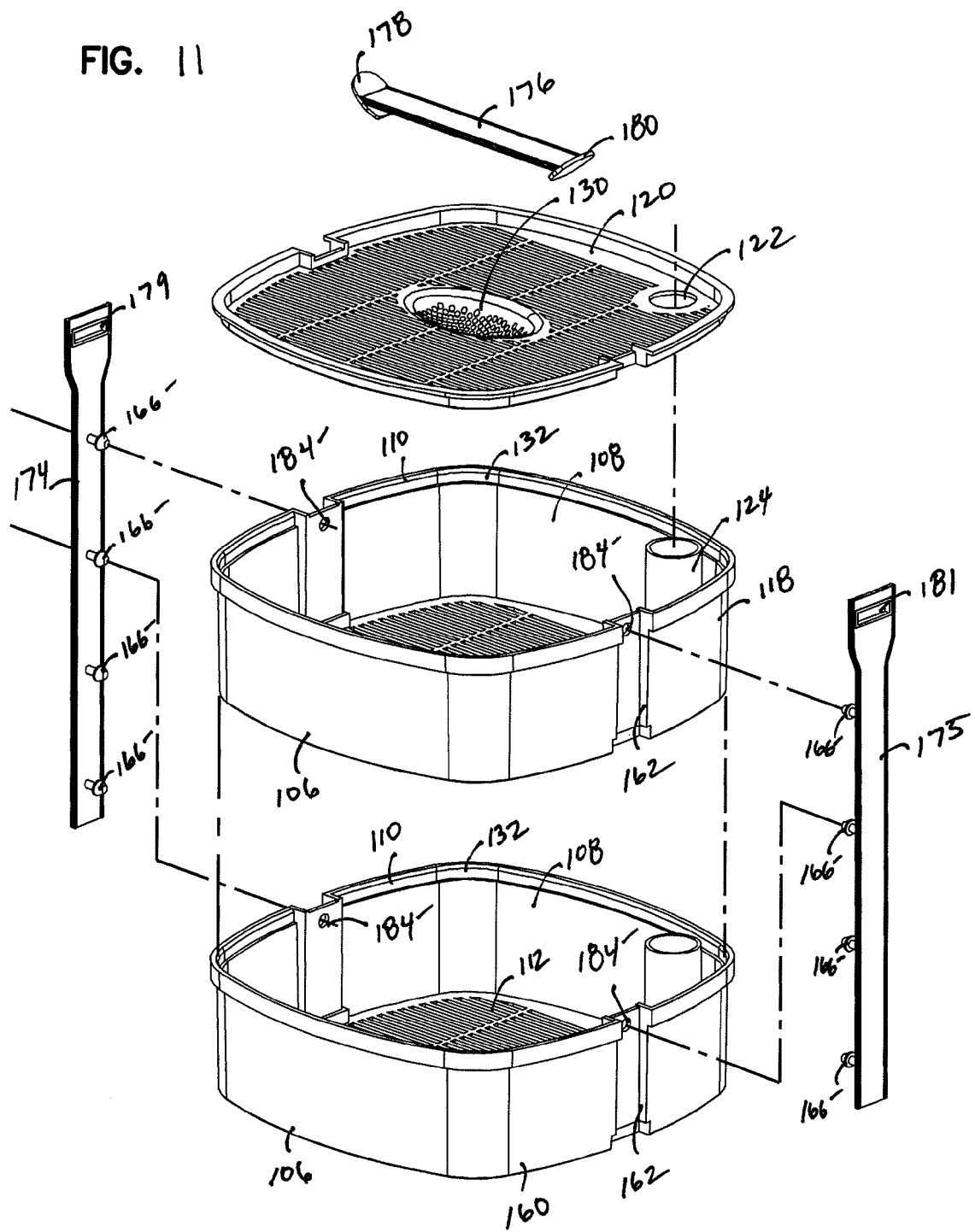
FIG. 11 is an exploded, perspective view of a portion of an alternate embodiment of the filter assembly of FIG. 5, illustrating an alternate way of releasably securing the trays together, constructed in accordance with principles of this disclosure.

Referring now to FIGS. 5, 6, and 10, in the example shown, the outer surrounding wall 106 of each tray 100-103 has an exterior portion 160 defining first and second spaced grooves 162, 163. In the example shown, the outer surrounding wall 106 of each of the trays 100-103 is generally rectangular in shape with somewhat rounded corners. The grooves 162, 163 are spaced apart from each other such that they are on opposite sides of the rectangular shape. In FIG. 6, it can be seen how, for each tray, the first groove 162 and the second groove 163 are in opposing relation to each other, such that they are spaced about 180 degrees apart.

In the example shown, when the trays 100-103 are arranged in the vertical stack 104, each of the spaced first and second grooves 162, 163 is in vertical alignment with the grooves 162, 163 of the other trays 100-103 when vertically stacked. As such, when the trays 100-103 are oriented in the vertical stack 104, the aligned grooves 162, 163 form recessed receiving channels 164 (FIG. 3) and 165 (FIG. 10).

In preferred embodiments, each tray 100-103 a pair of protrusions 166 (FIG. 3), 167 (FIG. 10). The protrusions 166, 167 extend from the exterior portion 160 of the outer wall 106. In preferred embodiments, the protrusions 166, 167 form part of the connection assembly that releasably secures the trays 100-103 to the strap 156.

In one example embodiment, each of the protrusions 166, 167 is extending from the exterior portion 160 within a respective groove 162, 163. In the example shown in FIG. 6, the protrusion 166 is located adjacent to the open top face 110 and centered within the groove 162. The protrusion 167, in the embodiment shown, is within the groove 163 (FIG. 10).

Each of the protrusions 166, 167 includes a stem or neck connected to the outer surrounding wall 106. At the end of the neck is a head 172 at a free end. Preferably, the protrusion 166 does not project beyond the depth of the groove 162, so that the protrusion 166 does not extend past the outer wall 106 adjacent to the groove 162.

One example arrangement for the strap 156 is now discussed. In FIGS. 5 and 6, the strap 156 is depicted as being in three sections 174, 175, 176. These sections 174, 175, 176 are connectable together to form a single, integral strap 156 (FIG. 10). The sections may be either permanently connectable together or removably connectable together. In selected embodiments, the strap 156 will be formed as one continuous member. By the term "strap 156," it is meant to cover embodiments whether it is formed from one solid piece of material, or whether it is formed from separate sections connected together (connected either permanently or temporarily).

In the example embodiment shown in FIGS. 5 and 6, the section 176 forms the handle 158. The section 176 is connectable through an attaching tab assembly 178 to a receiving slot 179 in the section 174. Similarly, the section 176 includes, at an opposite end from tab assembly 178, a tab assembly 180 that is attachable to a slot 181 in the section 175.

Figure 3:
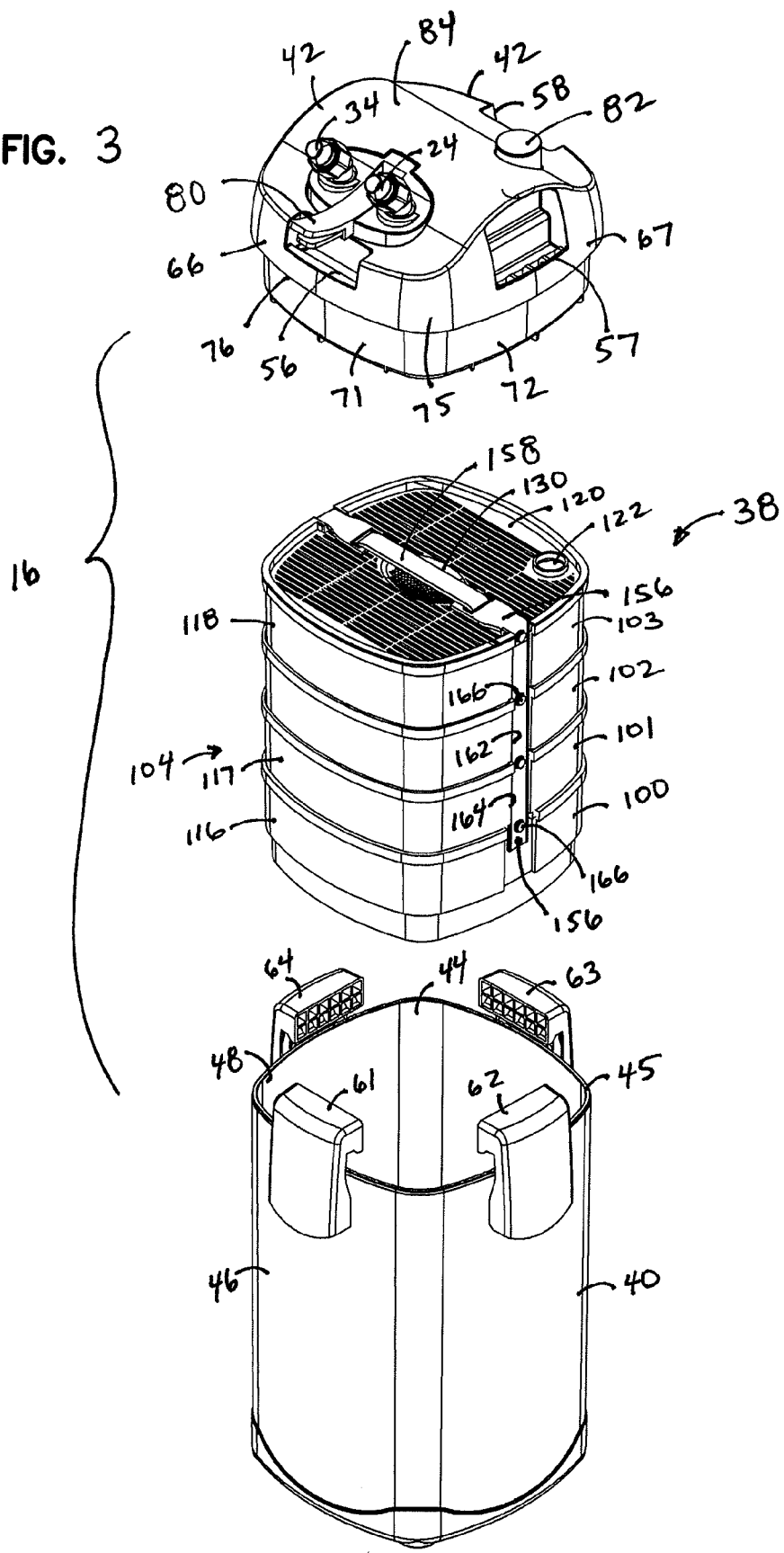
FIG. 3 is an exploded, top perspective view of the filter of FIG. 2, and showing the internal filter assembly, constructed in accordance with the principles of this disclosure.

As can be seen in FIGS. 3 and 4, the stacked trays 104 are releasably connected together along the aligned first and second grooves 162, 163 (FIG. 10). In the example shown, the protrusions 166, 167 of each of the trays 100-103 cooperate with the releasable connection between the trays 100-103. In one preferred example, the strap 156 extends within the receiving channel 164 of the aligned first grooves 162 engaging each protrusion 166. Similarly, the strap 156 extends within the receiving channel 165 of the aligned second grooves 163 and releasably engages each of the protrusions 167.

In one example, the way in which the strap 156 releasably engages the protrusions 166, 167 is by having the protrusions 166, 167 penetrate the strap 156 through apertures 184 formed in the strap 156. As can be seen in FIG. 6, section 174 includes a plurality of apertures 184 passing through the strap 156. Similarly, section 175 has apertures 184 passing through the strap 156. The apertures 184 are spaced from each other to generally line up with the protrusions 166, 167 on the trays 100-103. By having the head 172 of each protrusion 166, 167 pass through an aperture 184, the respective tray 100-103 is releasably connected, attached, or secured to the other trays 100-103 in the stack 104. Of course, there are many alternative ways of connecting the strap 156 to the trays 100-103. Some non-limiting examples are shown in FIGS. 11-13.

In FIG. 11, the protrusions and apertures are reversed from the embodiment shown in FIGS. 5 and 6. That is, instead of having apertures 184 in the strap 156, the apertures 184' are in the trays, while the protrusions 166' extend from the strap 156. As can be seen in FIG. 11, in this non-limiting example, the apertures 184' are located within the grooves 162, to allow the strap sections 174, 175 to fit within the grooves 162 and then permit the protrusions 166' to pass through the apertures 184' in the trays. In this manner, the stacked trays 104 are releasably secured together.

In FIG. 12, the stacked trays 104 are releasably secured together through a combination of the strap section 174 engaging protrusions 166 along one side of the trays, while along the other side of the trays, the stacked trays 104 are releasably secured together through a hook arrangement 200. Specifically, the hook arrangement 200 includes a hook 202 that is received within and engages a slot or catch 204. In FIG. 12, each of the trays in the stacked trays 104 includes, adjacent to the upper rim 132, a slot or catch 204. On a side 206 of the trays that is on an opposite side from the groove 162 holding the protrusion 166. In the embodiment shown, generally in alignment with the slot or catch 204 and extending from a bottom rim 208 of the trays in the stacked trays 104 is the hook 202. The hook 202 of each tray is received within and engages the slot or catch 204 of the next adjacent tray that is below it in the stack. For the top tray 118, the porous grid 120 includes the hook 202 extending or projecting in a direction toward the top tray 118, so that it engages the slot or catch 204 in the tray 118. The engagement between each of the hooks 202 and the respective slot or catch 204 is a selectively releasable engagement. In this embodiment, the strap section 176 that also forms the handle 158 can be unattached at tab assembly 180; alternatively, the tray 120 could be modified to include structure with a slot to receive the tab assembly 180. Of course, in this embodiment, the position of the protrusions 166 and apertures 184 could be reversed, per the embodiment of FIG. 11.

In the embodiment of FIG. 13, the strap 156 is eliminated altogether. In this embodiment, the stacked trays 104 are releasably secured together through a snap structure 212. For example, in this embodiment, the trays still have protrusions 166 extending from the exterior portion 160 of the surrounding wall 106 of the trays 100-103. Each of the trays also includes, in alignment with the protrusions 166, an extension 214 extending from the bottom rim 208 of the trays. The extension 214 includes a receptacle 216 that engages the protrusion 166 of the tray in the stack 104 immediately below it. This engagement between the receptacle 216 and the protrusion 166 can be one of a variety of engagements, including, for example, a conventional snap engagement; or a through-snap engagement. In the example of a through-snap engagement, the receptacle 216 will be an open aperture, which receives the protrusion 166 therein. In the case of a conventional snap engagement, the receptacle 216 would be in the form of a conventional snap-fit, as is known in the art. In the embodiment of FIG. 13, the porous grid 120 covering the top tray 118 also includes the extension 214 extending in a direction toward the top tray 118 so that the receptacle 216 will engage the protrusion 166.

In FIG. 13, it should also be understood that along the side 218 that is opposite of the side 206, there is also snap structure 212 between the trays, but it is not visible from the particular perspective. It should be understood that the snap structure 212 along side 218 is identical in appearance to the snap structure 212 shown along side 206. In FIG. 13, the handle 158 can be attached to the porous grid 120 through conventional mechanical means, such as slot structure that is built into the porous grid 120 to receive tab assemblies 178, 180. Alternate embodiments are possible.

E. Example Handle

Again in reference to FIG. 3, the strap 156 extends over the concave portion 130 of the porous grid 120. The concave portion 130 is preferably sized to accommodate a portion of at least a few fingers of a human hand. As such, when the strap 156 extends over the concave portion 130, it forms the handle 158. This way, somebody wanting to move the filter assembly 38 can grasp the handle 158 and include a part of the hand extending into the concave portion 130.

Of course, in other embodiments, the concave portion 130 can be omitted, and a handle 158 can be made in a manner to extend or project further above the filter assembly 38 for convenient grasping. Alternative locations for the handle 158 can also be implemented, without departing from principles of this disclosure. In addition, there are many alternate embodiments of the handle that can be made, and the examples discussed herein are just some examples.

F. Example Methods

A method of servicing the filter assembly 38 can be practiced applying principles of this disclosure. The method includes removing a cover from a canister filter to access an interior of the canister filter. In the example shown herein, this includes removing the cover assembly 42 from the canister filter 16 to access the interior 48 of the housing body 40. In one example step of this step, the cover assembly 42 is removed by moving the locking lever 80 to an unlocked position and releasing the buckles 61-64 from the buckle catches 56-59.

A method of servicing a filter assembly can also include a step of grasping a handle secured to a stack of trays, each of the trays in the stack being releasably secured together. One example of this step includes grasping the handle 158 secured to the stack 104. Preferably, in a further example, the step of grasping the handle 158 includes grasping a strap 156 extending above or over the stack of trays 104.

Another example step of the method includes a step of removing, in a single step, the stacked trays from the canister filter, in which each of the stacked trays holds removable filter media. One example of this step includes removing the stacked trays 104 from the canister filter 16, in which each of the stacked trays 100-103 includes removable filter media 114. In a further example, this step of removing in a single step the stacked trays from the canister filter can include the step of breaking a seal between an open aperture in a bottom tray in the stacked trays and a closed projection extending from a bottom of the canister filter. For example, this can include breaking the sealing engagement 146 between aperture 138 in the bottom tray 116 and closed projection 144 extending from the bottom 50 of the canister filter 16.

One further example method step includes allowing liquid to drain through an aperture in the bottom of the filter assembly before removing the filter assembly from the housing body of the canister filter. For example, this step can include allowing water to drain through aperture 138 in the bottom tray of the filter assembly 38 and into the interior 48 of the housing body 40.

A method of servicing a filter assembly may also include, after the step of removing in a single step the stacked trays from the canister filter, unsecuring each of the trays from the stack of trays. This can include, for example, unsecuring trays 100-103 from the stack 104. This step would involve not destroying any of the trays 100-103 in the stack 104. Preferably, it would not involve the use of tools, although some use of tools may be used (but the use of tools is not preferred).

In one example, the step of unsecuring each of the trays from the stack of trays includes releasing engagement between a strap securing each of the trays together and a pair of protrusions extending from each of the trays. For example, this can include releasing engagement between strap 156 securing each of the trays in the stack 104 together and protrusions 166, 167 extending from each of the trays in the stack 104.

In one example, this would include pulling the strap 156 laterally in a direction away from the stack 104 to pull the strap 156 so that the protrusions 166, 167 are no longer penetrating the apertures 184.

The method can further include, after the step of unsecuring each of the trays from the stack of trays, cleaning or replacing the filter media in each of the trays to result in refurbished trays. By "refurbished trays," it is meant the same trays but with either new or cleaned filter media therewithin. In one example, this can include cleaning or replacing media 114 from the interior volume 108 of each of the trays 100-103. The cleaned or replaced media 114 is then put back into the interior volume 108 of each of the trays 100-103 to result in refurbished trays.

The method may also include the step of releasably securing refurbished trays together into a stack of refurbished trays having a handle. For example, this can include connecting the strap 156 to each of the refurbished trays 100-103 along opposite sides of each of the trays 100-103 to form the handle 158 between the sides and above the stack 104. In one example, this can include passing the protrusions 166, 167 through the apertures 184 to releasably secure the trays 100-103 together again into stack 104. It should be understood that this stack 104 can include only two trays of the trays 100-103 or more than two trays.

The method can also include the step of grasping the handle to move the stack of refurbished trays and orienting the stack of refurbished trays into the interior of the canister filter. For example, this can include grasping handle 158 to move the stack 104 and orienting the stack 104 into the housing body 40 by placing it through the open top 44. In one example method, this can also include forming a sealing engagement 146 between the aperture 138 in the bottom wall 136 of the bottom tray 116 and projection 144 from the closed bottom 50 of the housing body 40.

The method may also then include the step of placing the cover assembly 42 back onto the housing body 40 and securing it thereto. The security can be through engagement between buckles 61-64 and buckle catches 56-59. The locking lever 80 may then be engaged.

Variations and alternate methods can be employed. These are just some example steps for some methods.

G. Example Operation

In operation, water to be filtered flows from the tank 112, through the intake pipe 118, and to the water inlet 24 of the canister filter 16. The water to be filtered then flows through the inlet 24 into the inlet reservoir 92. From there, the water flows from the cover assembly 42 into the filter assembly 38 by flowing through the flow channel 128. The water flows through the flow channel 128 until it reaches the unfiltered liquid reservoir 126. From there, the water is drawn upwardly through the filter assembly 38, where it passes through the filter media 114 in each of the trays 100-103.

Specifically, the water first passes through the ceramic rings or balls 148 in the bottom tray 116. Then it flows through the grid 112 to the next tray 117 where it flows through the plastic balls 150. From there, it flows through the porous grid 112 to the tray 102 and passes through the foam 152. From there, it flows through the porous grid 112 to the top tray 118 and through the bio-bag cartridge 154. From there, the filtered water flows through the grid 120 and passes from the filter assembly 38 to the cover assembly 42 through the aperture arrangement 96.

From there, the filtered water flows into the outlet reservoir 94 and then through the water outlet 34. It then leaves the canister filter 16 and flows through the tubing 36 and returns to the tank 12 by passing through the flow return pipe 28.

The above disclosure presents example principles. Many embodiments can be made applying these principles.

We claim:

1. A filter assembly for an external filter for an aquarium; the filter assembly comprising:
    (a) at least two stacked trays releasably secured together in series; each of the trays having: an outer surrounding wall defining an interior volume; an open top face, a porous holding grid extending between the surrounding wall; and the interior volume defining a compartment for holding filter media within the interior volume for orientation on the porous holding grid; and
        (i) wherein the trays are vertically stacked to provide a bottom tray; the open top face of the bottom tray is adjacent to and covered by the porous holding grid of the tray stacked above the bottom tray;
        (ii) the bottom tray including a bottom wall extending from the outer surrounding wall and spaced from the bottom tray porous holding grid; the bottom wall having an open aperture therein; the bottom wall being at an end of the bottom tray opposite of the bottom tray open top face.

2. A filter assembly according to claim 1 wherein:
    (a) the stacked trays include an uppermost top tray in the stack; the uppermost top tray in the stack further including a porous grid covering its open top face.

3. A filter assembly according to claim 1 wherein:
    (a) the stacked trays includes at least a third tray releasably secured together in series with the at least two stacked trays; the third tray includes: an outer surrounding wall defining an interior volume; an open top face, a porous holding grid extending between the surrounding wall; and filter media being within the interior volume oriented on the porous holding grid;
        (i) the porous holding grid of the third tray being adjacent to and covering the open top face of one of the other trays in the stacked trays.

4. A filter assembly according to claim 3 wherein:
    (a) the stacked trays includes at least a fourth tray releasably secured together in series with the at least two stacked trays and the third tray; the fourth tray includes: an outer surrounding wall defining an interior volume; an open top face, a porous holding grid extending between the surrounding wall; and filter media being within the interior volume oriented on the porous holding grid;
        (i) the porous holding grid of the fourth tray being adjacent to and covering the open top face of one of the other trays in the stacked trays.

5. A filter assembly according to claim 1 wherein:
    (a) each of the trays has filter media within the interior volume; the filter media being any one of: ceramic beads, plastic balls, black foam, or floss and carbon.

6. A filter assembly according to claim 1 wherein:
    (a) the outer surrounding wall of each tray defines an upper rim, the open top face being surrounded by the upper rim; and
        (i) the trays are vertically stacked so that each tray nests within the upper rim of the tray immediately below it.

7. A filter assembly according to claim 1 wherein:
    (a) the outer surrounding wall of each tray has an exterior portion defining a pair of spaced grooves; each of the spaced grooves is in alignment with the spaced groove of the other trays when vertically stacked.

8. A filter assembly according to claim 7 wherein:
    (a) the stacked trays are releasably connected together along the aligned spaced grooves;
        (i) the pair of grooves for each tray includes a first vertical groove and a second vertical groove spaced about 180 degrees apart.

9. A filter assembly according to claim 8 wherein:
    (a) each of the trays has a protrusion extending from each of the first and second grooves; the protrusions of each of the trays cooperating with the releasable connection.

10. A filter assembly according to claim 9 further comprising:
    (a) a strap releasably securing the stack of trays together; the strap extending within the aligned first grooves and releasably engaging each of the protrusions; and the strap extending with the aligned second grooves and releasably engaging each of the protrusions.

11. A filter assembly according to claim 10 wherein:
    (a) the stacked trays includes an uppermost top tray in the stack; the uppermost top tray in the stack further including an porous grid covering its open top face; and
    (b) the strap extends over the porous grid of the uppermost top tray to provide a carrying handle.

12. A filter assembly according to claim 11 wherein:
    (a) the porous grid of the uppermost top tray includes a concave portion;
    (b) the strap extending over the concave portion, wherein the concave portion is sized to accommodate a portion of a human hand.

13. A filter assembly according to claim 1 wherein:
    (a) the at least two stacked trays are releasably secured together with a selectively removable strap extending along at least one side of the stacked trays and forming a handle at a top portion of the stacked trays.

14. A filter assembly according to claim 13 wherein:
    (a) the trays and the strap are releasably secured together through protrusions and apertures between the trays and the strap.

15. A filter assembly according to claim 13 wherein:
    (a) the strap extends along only a single side of the stacked trays, and the trays are releasably secured together on an opposite side with a hook arrangement.

16. A filter assembly according to claim 1 wherein:
    (a) the at least two stacked trays are releasably secured together with a releasable snap engagement between each of the trays.

17. A tray for a filter assembly for an external filter for an aquarium;
    the tray comprising:
    (a) an outer surrounding wall having an exterior portion and an interior portion; the interior portion defining an interior volume;
    (b) an open top face;
    (c) a porous holding grid extending between the surrounding wall;

(d) removable and replaceable filter media being within the interior volume oriented on the porous holding grid;
(e) attachment structure constructed and arranged to permit releasable attachment to other trays;
 (i) the attachment structure including a first protrusion extending from the exterior portion of the outer surrounding wall; and a second protrusion extending from the exterior portion of the outer surrounding wall; the second protrusion spaced on an opposite side of the tray from the first protrusion; the first and second protrusions being sized to engage apertures in a strap, when the strap is used to connect to the tray.

18. A tray according to claim 17 wherein:
(a) the exterior portion of the outer surrounding wall has first and second spaced vertical grooves;
 (i) the first protrusion being within the first groove; and
 (ii) the second protrusion being within the second groove.

19. An external filter for an aquarium; the filter comprising:
(a) a canister filter having a canister housing body and a removable cover assembly;
 (i) the cover assembly including a motor unit, a water inlet, and a water outlet;
 (ii) the housing body having an open top closeable by the cover assembly, an interior, and a closed bottom; and
(b) a filter assembly removably oriented in the interior of the housing body; the filter assembly including:
 (i) at least two stacked trays releasably secured together in series; each of the trays having: an outer surrounding wall defining an interior volume; an open top face, a porous holding grid extending between the surrounding wall; and the interior volume defining a compartment for filter media for orientation on the porous holding grid; and
  wherein the trays are vertically stacked to provide a bottom tray; the open top face of the bottom tray is adjacent to and covered by the porous holding grid of the tray stacked above the bottom tray;
 (ii) the bottom tray including a bottom wall extending from the outer surrounding wall and spaced from the bottom tray porous holding grid; the bottom wall having an open aperture therein; the bottom wall being at an end of the bottom tray opposite of the bottom tray open top face; and the closed bottom of the housing body including a projection extending into the interior of the housing body; the open aperture of the bottom wall of the bottom tray being in sealing engagement with the projection of the closed bottom of the housing body.

20. A filter according to claim 19 wherein:
(a) the at least two stacked trays are releasably secured together with a selectively removable strap extending along opposite sides of the stacked trays and forming a handle at a top portion of the stacked trays.

21. A filter according to claim 20 wherein:
(a) each of the trays in the stack includes at least two protrusions on opposite sides of the tray; the protrusions releasably engaging the strap.

22. A filter according to claim 19 wherein:
(a) the at least two stacked trays are releasably secured together with at least one of a hook and catch arrangement, or a snap arrangement.

23. A filter assembly for an external filter for an aquarium; the filter assembly comprising:
(a) at least two stacked trays releasably secured together in series; each of the trays having: an outer surrounding wall defining an interior volume; an open top face, a porous holding grid extending between the surrounding wall; and the interior volume defining a compartment for holding filter media within the interior volume for orientation on the porous holding grid; and
 (i) wherein the trays are vertically stacked to provide a bottom tray; the open top face of the bottom tray is adjacent to and covered by the porous holding grid of the tray stacked above the bottom tray;
 (ii) the outer surrounding wall of each tray having an exterior portion defining a pair of spaced grooves; each of the spaced grooves is in alignment with the spaced groove of the other trays when vertically stacked.

24. A filter assembly according to claim 23 wherein:
(a) the stacked trays are releasably connected together along the aligned spaced grooves;
 (i) the pair of grooves for each tray includes a first vertical groove and a second vertical groove spaced about 180 degrees apart.

25. A filter assembly according to claim 24 wherein:
(a) each of the trays has a protrusion extending from each of the first and second grooves; the protrusions of each of the trays cooperating with the releasable connection.

26. A filter assembly according to claim 25 further comprising:
(a) a strap releasably securing the stack of trays together; the strap extending within the aligned first grooves and releasably engaging each of the protrusions; and the strap extending with the aligned second grooves and releasably engaging each of the protrusions.

27. A filter assembly according to claim 26 wherein:
(a) the stacked trays includes an uppermost top tray in the stack; the uppermost top tray in the stack further including an porous grid covering its open top face; and
(b) the strap extends over the porous grid of the uppermost top tray to provide a carrying handle.

28. A filter assembly according to claim 27 wherein:
(a) the porous grid of the uppermost top tray includes a concave portion;
(b) the strap extending over the concave portion, wherein the concave portion is sized to accommodate a portion of a human hand.

29. A filter assembly for an external filter for an aquarium; the filter assembly comprising:
(a) at least two stacked trays releasably secured together in series; each of the trays having: an outer surrounding wall defining an interior volume; an open top face, a porous holding grid extending between the surrounding wall; and the interior volume defining a compartment for holding filter media within the interior volume for orientation on the porous holding grid; and
 (i) wherein the trays are vertically stacked to provide a bottom tray; the open top face of the bottom tray is adjacent to and covered by the porous holding grid of the tray stacked above the bottom tray;
 (ii) the at least two stacked trays being releasably secured together with a selectively removable strap extending along at least one side of the stacked trays and forming a handle at a top portion of the stacked trays.

30. A filter assembly according to claim 29 wherein:
(a) the trays and the strap are releasably secured together through protrusions and apertures between the trays and the strap.

31. A filter assembly according to claim 29 wherein:
(a) the strap extends along only a single side of the stacked trays, and the trays are releasably secured together on an opposite side with a hook arrangement.

32. A filter assembly for an external filter for an aquarium; the filter assembly comprising:
(a) at least two stacked trays releasably secured together in series; each of the trays having: an outer surrounding wall defining an interior volume; an open top face, a porous holding grid extending between the surrounding wall; and the interior volume defining a compartment for holding filter media within the interior volume for orientation on the porous holding grid; and
   (i) wherein the trays are vertically stacked to provide a bottom tray; the open top face of the bottom tray is adjacent to and covered by the porous holding grid of the tray stacked above the bottom tray;
   (ii) the at least two stacked trays are releasably secured together with a releasable snap engagement between each of the trays.

33. A filter assembly according to claim 32 wherein:
(a) the stacked trays includes at least a third tray releasably secured together in series with the at least two stacked trays; the third tray includes: an outer surrounding wall defining an interior volume; an open top face, a porous holding grid extending between the surrounding wall; and filter media being within the interior volume oriented on the porous holding grid;
   (i) the porous holding grid of the third tray being adjacent to and covering the open top face of one of the other trays in the stacked trays.

34. A filter assembly according to claim 33 wherein:
(a) the stacked trays includes at least a fourth tray releasably secured together in series with the at least two stacked trays and the third tray; the fourth tray includes: an outer surrounding wall defining an interior volume; an open top face, a porous holding grid extending between the surrounding wall; and filter media being within the interior volume oriented on the porous holding grid;
   (i) the porous holding grid of the fourth tray being adjacent to and covering the open top face of one of the other trays in the stacked trays.

35. A filter assembly according to claim 32 wherein:
(a) each of the trays has filter media within the interior volume; the filter media being any one of: ceramic beads, plastic balls, black foam, or floss and carbon.

36. A filter assembly according to claim 32 wherein:
(a) the outer surrounding wall of each tray defines an upper rim, the open top face being surrounded by the upper rim; and
   (i) the trays are vertically stacked so that each tray nests within the upper rim of the tray immediately below it.

* * * * *